(12) United States Patent
Sun et al.

(10) Patent No.: US 11,971,629 B2
(45) Date of Patent: Apr. 30, 2024

(54) LIQUID CRYSTAL DISPLAY PANELS AND DISPLAY APPARATUSES

(71) Applicants: Ordos Yuansheng Optoelectronics Co., Ltd., Inner Mongolia (CN); BOE Technology Group Co., Ltd., Beijing (CN)

(72) Inventors: Long Sun, Beijing (CN); Wenlong Zhang, Beijing (CN); Xin Zhao, Beijing (CN); Yanwei Ren, Beijing (CN); Yanhao Sun, Beijing (CN); Huijie Zhang, Beijing (CN); Jingwei Hou, Beijing (CN)

(73) Assignees: Ordos Yuansheng Optoelectronics Co., Ltd., Inner Mongolia (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/926,956

(22) PCT Filed: Sep. 1, 2021

(86) PCT No.: PCT/CN2021/116028
§ 371 (c)(1),
(2) Date: Nov. 21, 2022

(87) PCT Pub. No.: WO2022/078096
PCT Pub. Date: Apr. 21, 2022

(65) Prior Publication Data
US 2023/0194929 A1    Jun. 22, 2023

(30) Foreign Application Priority Data
Oct. 16, 2020 (CN) .......................... 202022318684.3

(51) Int. Cl.
*G02F 1/1339* (2006.01)
*G02F 1/1333* (2006.01)
*G02F 1/1335* (2006.01)

(52) U.S. Cl.
CPC ...... *G02F 1/1339* (2013.01); *G02F 1/133357* (2021.01); *G02F 1/133512* (2013.01); *G02F 2202/103* (2013.01)

(58) Field of Classification Search
None
See application file for complete search history.

(56) References Cited

U.S. PATENT DOCUMENTS 9,316,859 B2 * 4/2016 Shin .................. G02F 1/133512
9,958,733 B2 * 5/2018 Lee ................... G02F 1/133345
(Continued)

FOREIGN PATENT DOCUMENTS

CN    103901671 A    7/2014
CN    203759393 U    8/2014
(Continued)

OTHER PUBLICATIONS

PCT/CN2021/116028 international search report.
PCT/CN2021/116028 Written Opinion.

*Primary Examiner* — Ryan Crockett
(74) *Attorney, Agent, or Firm* — IPro, PLLC (57) ABSTRACT

A liquid crystal display panel (100) and a display apparatus (200). The liquid crystal display panel (100) includes a color filter substrate (1), an array substrate (2), and a sealant (3). An amorphous silicon layer (4) and a first interlayer dielectric (5) are provided between a shading layer (12) and a first substrate (11), a first through groove (12a) is formed in the shading layer (12) and the amorphous silicon layer (4), and a part of the sealant (3) is filled in the first through groove (12a) and is in direct contact with the first interlayer dielectric (5); and/or a planarization layer (22) is wrapped with a (Continued)

second interlayer dielectric (6), such that the planarization layer (22) is respectively separated from the sealant (3) and a second substrate (21), and the second interlayer dielectric (6) is in direct contact with the sealant (3). The phenomenon of film separation in a liquid crystal display panel is effectively alleviated, and the reliability of the liquid crystal display panel is improved.

20 Claims, 4 Drawing Sheets

(56) References Cited

U.S. PATENT DOCUMENTS

| | | | | |
|---|---|---|---|---|
| 2001/0022639 A1* | 9/2001 | Kwak | ............... | G02F 1/1345 349/122 |
| 2003/0090615 A1* | 5/2003 | Park | ............... | G02F 1/1339 349/153 |
| 2003/0122978 A1* | 7/2003 | Lim | ............... | G02F 1/1339 349/42 |
| 2004/0075801 A1* | 4/2004 | Choi | ............... | G02F 1/133512 349/153 |
| 2007/0085116 A1* | 4/2007 | Lee | ............... | G02F 1/1345 257/291 |
| 2007/0146620 A1 | 6/2007 | Araki et al. | | |
| 2014/0016070 A1* | 1/2014 | Choi | ............... | G02F 1/1339 349/139 |
| 2014/0092351 A1* | 4/2014 | Hatakeyama | ....... | G02F 1/13306 445/25 |
| 2014/0176895 A1 | 6/2014 | Park | | |
| 2017/0075174 A1 | 3/2017 | Lee et al. | | |
| 2017/0235186 A1* | 8/2017 | Dong | ............... | G02F 1/133512 349/106 |
| 2019/0369431 A1 | 12/2019 | Chan | | |
| 2020/0387018 A1 | 12/2020 | Wu | | |
| 2021/0055583 A1 | 2/2021 | Song | | |

FOREIGN PATENT DOCUMENTS

| | | |
|---|---|---|
| CN | 107390411 A | 11/2017 |
| CN | 108398835 A | 8/2018 |
| CN | 208721944 U | 4/2019 |
| CN | 110967857 A | 4/2020 |
| CN | 111458912 A | 7/2020 |
| CN | 212808868 U | 3/2021 |

\* cited by examiner

LIQUID CRYSTAL DISPLAY PANELS AND DISPLAY APPARATUSES

CROSS-REFERENCE TO RELATED APPLICATIONS

This application is the U.S. national phase of PCT Application No. PCT/CN2021/116028 filed on Sep. 1, 2021, which is based on and claims priority to Chinese Patent Application No. 202022318684.3 filed on Oct. 16, 2020, both of which are incorporated herein by reference in their entireties.

TECHNICAL FIELD

This application relates to the field of display technology, and in particular to a liquid crystal display panel and a display apparatus.

BACKGROUND

A liquid crystal display panel may determine the brightness, contrast, color, and viewing angle of a liquid crystal display. The quality of the liquid crystal display panel is related to an overall performance of the liquid crystal display.

In the related art, a lot of film separation exists in the reliability process of the liquid crystal display panel, resulting in a poor reliability of the liquid crystal display panel.

SUMMARY

The present application aims to solve at least one of the technical problems existing in the related art. To this end, the present application provides a liquid crystal display panel. The liquid crystal display panel has a good reliability, which facilitates an improvement in product yield.

The present application further provides a display apparatus having the liquid crystal display panel described above.

The liquid crystal display panel according to a first aspect of the present application includes: a color filter substrate and an array substrate disposed opposite to each other, the color filter substrate including a first substrate and a shading layer, the shading layer being disposed on a side of the first substrate facing the array substrate, and the array substrate including a second substrate and a planarization layer, the planarization layer being disposed on a side of the second substrate facing the color filter substrate; and a sealant provided between the array substrate and the color filter substrate in a non-display area of the liquid crystal display panel, where an amorphous silicon layer and a first interlayer dielectric are provided between the shading layer and the first substrate, the first interlayer dielectric is provided between the amorphous silicon layer and the first substrate, a first through groove is formed in the shading layer and the amorphous silicon layer, is disposed opposite to the sealant, and penetrates the shading layer and the amorphous silicon layer in a thickness direction of the liquid crystal display panel, and a part of the sealant is filled in the first through groove and is in direct contact with the first interlayer dielectric; and/or the planarization layer is wrapped with a second interlayer dielectric, such that the planarization layer is respectively separated from the sealant and the second substrate, and the second interlayer dielectric is in direct contact with the sealant.

The liquid crystal display panel according to the present application adopts the design of film layers including a shading layer, an amorphous silicon layer, and a first interlayer dielectric, such that a part of a sealant is filled in a first through groove in the shading layer and the amorphous silicon layer and the sealant is in direct contact with the first interlayer dielectric, and/or a planarization layer is wrapped with a second interlayer dielectric, such that the planarization layer is respectively separated from the sealant and a second substrate, and the sealant is in direct contact with the second interlayer dielectric, which effectively alleviates film separation in the liquid crystal display panel and improves the reliability of the liquid crystal display panel.

In some embodiments, the shading layer is made of a metal material.

In some embodiments, in a case that the first through groove is formed in the shading layer and the amorphous silicon layer, a number of the first through groove is two or more, the two or more first through grooves being arranged at intervals in a direction perpendicular to a direction in which the first through groove extends.

In some embodiments, in a case that the first through groove is formed in the shading layer and the amorphous silicon layer, a number of the first through groove is one, the one first through groove being disposed at an outer edge of the liquid crystal display panel; or a number of the first through groove is two or more, the two or more first through grooves being arranged at intervals in a direction perpendicular to a direction in which the first through groove extends, and one of the two or more first through grooves being disposed at the outer edge of the liquid crystal display panel.

In some embodiments, in a case that the first through groove is formed in the shading layer and the amorphous silicon layer, a second through groove is further formed in the shading layer, the second through groove is spaced apart from the first through groove, penetrates at least the shading layer from a side of the shading layer away from the first substrate in the thickness direction of the liquid crystal display panel, and is filled with a blue pixel pigment, and the first through groove is disposed on a side of the second through groove adjacent to a central axis of the liquid crystal display panel and/or on a side of the second through groove away from the central axis of the liquid crystal display panel.

In some embodiments, in a case that the planarization layer is wrapped with the second interlayer dielectric, the second interlayer dielectric includes: a first portion provided between the planarization layer and the sealant, such that the planarization layer is separated from the sealant, and the first portion is in direct contact with the sealant; a second portion provided between the planarization layer and the second substrate to separate the planarization layer from the second substrate; and a connecting portion, provided at an outer edge of the liquid crystal display panel, and connected between the first portion and the second portion.

In some embodiments, a third through groove is formed in the planarization layer, the third through groove being disposed opposite to the sealant, and penetrating the planarization layer in the thickness direction of the liquid crystal display panel, and a part of the second interlayer dielectric is filled in the third through groove.

In some embodiments, a number of the third through groove is two or more, the two or more third through grooves being arranged at intervals in a direction perpendicular to a direction in which the third through groove extends.

In some embodiments, each of the sealant, the first through groove, and the third through groove extends along the outer edge of the liquid crystal display panel to form a ring structure.

In some embodiments, the shading layer is made of molybdenum, the first interlayer dielectric is made of silicon nitride, and the second interlayer dielectric is made of silicon nitride or silicon oxide.

The display apparatus according to a second aspect of the present application includes the liquid crystal display panel according to the first aspect of the present application described above.

The display apparatus according to the present application is provided with the above liquid crystal display panel, which improves the reliability of the display apparatus and contributes to an improvement in product yield.

Additional aspects and advantages of the present application will be set forth, in part, in the following description, and in part will be apparent from the following description, or learned from the practice of the present application.

REFERENCE SIGNS display apparatus 200,
liquid crystal display panel 100, non-display area R1,
color filter substrate 1, first substrate 11, shading layer 12, first through groove 12a, second through groove 12b,
array substrate 2, second substrate 21, planarization layer 22, third through groove 22a,
sealant 3, amorphous silicon layer 4, first interlayer dielectric 5,
second interlayer dielectric 6, first portion 61, second portion 62, connecting portion 63,
blue pixel pigment 7.

DETAILED DESCRIPTION OF THE EMBODIMENTS

Embodiments of the present application will be described in detail below, examples of which are illustrated in the accompanying drawings, in which the same or similar reference numerals indicate the same or similar elements or elements having the same or similar functions throughout. The embodiments described below with reference to the accompanying drawings are exemplary and are intended to explain the present application, but are not to be construed as limiting the present application.

The following disclosure provides many different embodiments or examples to implement different structures of the present application. In order to simplify the disclosure of the present application, components and settings in specific examples will be described below. However, they are only examples and are not intended to limit the present application. In addition, the present application may repeat reference numerals and/or letters in different examples. This repetition is for the purpose of simplification and clarity, and does not in itself indicate the relationship among various embodiments and/or settings discussed. In addition, the present application provides examples of various specific processes and materials, but those ordinary skilled in the art may be aware of the applicability of other processes and/or the use of other materials.

Hereinafter, a liquid crystal display panel 100 according to a first aspect of embodiments of the present application will be described with reference to the accompanying drawings.

As shown in FIGS. 1 to 7, the liquid crystal display panel 100 includes a color filter substrate 1, an array substrate 2, and a sealant 3. The array substrate 2 is disposed opposite to the color filter substrate 1, for example, the array substrate 2 and the color filter substrate 1 are disposed opposite to each other in a thickness direction of the liquid crystal display panel 100 (for example, an AA' direction in FIG. 1). The sealant 3 is provided between the array substrate 2 and the color filter substrate 1 to ensure the tightness of bonding between the array substrate 2 and the color filter substrate 1. The liquid crystal display panel 100 has a display area and a non-display area R1 disposed around the display area, and the sealant 3 is disposed in the non-display area R1 of the liquid crystal display panel 100.

The color filter substrate 1 includes a first substrate 11 and a shading layer 12 (e.g., black matrix, BM), the shading layer 12 being disposed on a side of the first substrate 11 facing the array substrate 2. The shading layer 12 is disposed between the first substrate 11 and the array substrate 2. The array substrate 2 includes a second substrate 21 and a planarization layer 22, the planarization layer 22 being disposed on a side of the second substrate 21 facing the color filter substrate 1. The planarization layer 22 is disposed between the second substrate 21 and the color filter substrate 1.

Figure 1:
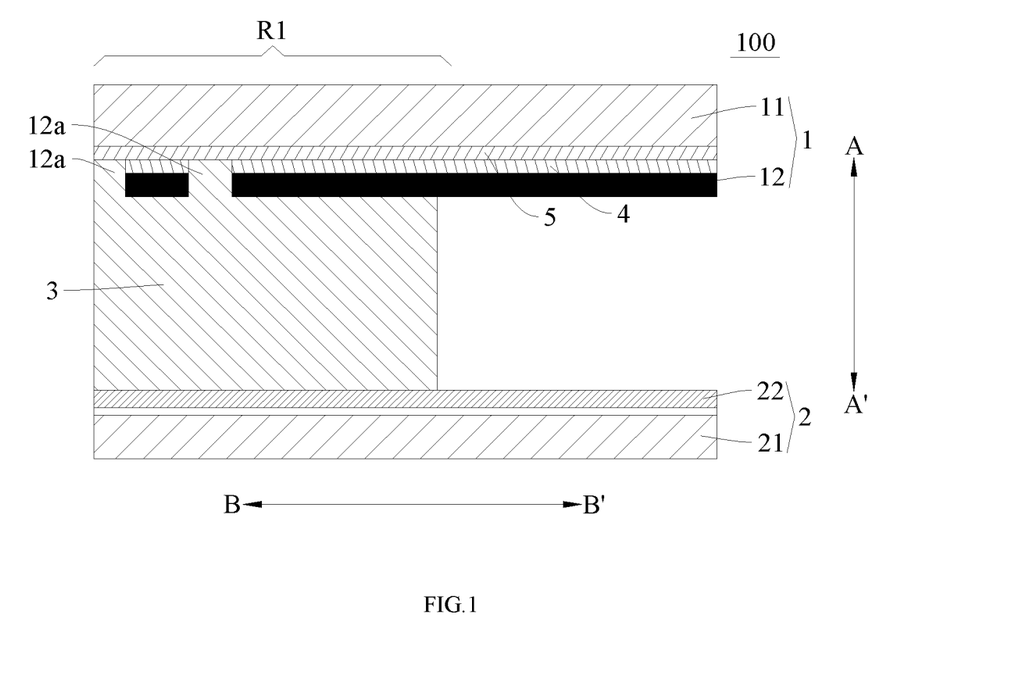
FIG. 1 is a schematic diagram of a liquid crystal display panel according to a first embodiment of the present application.
Figure 2:
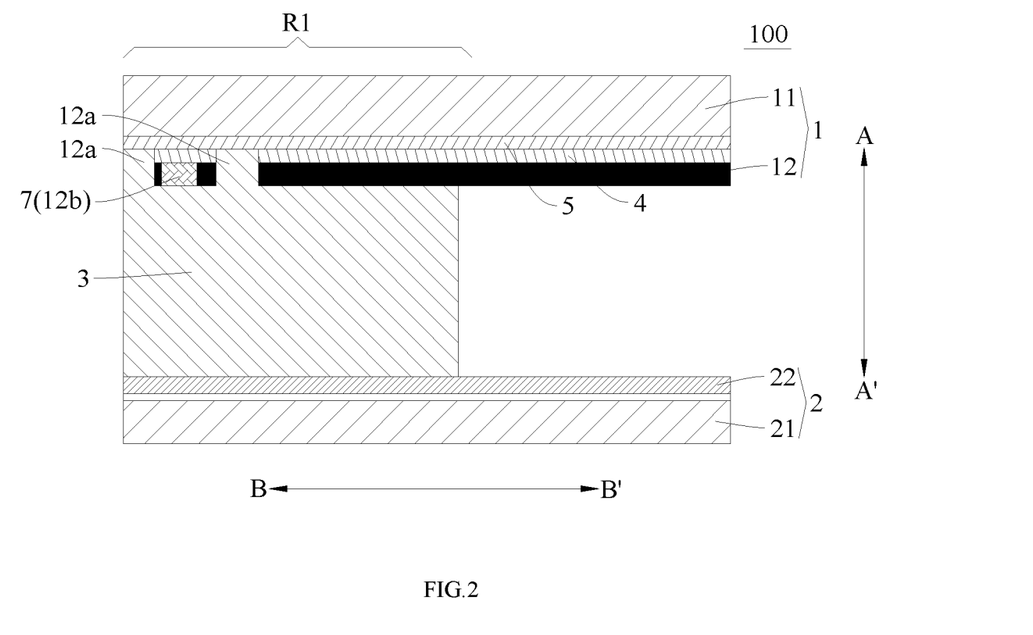
FIG. 2 is a schematic diagram of a liquid crystal display panel according to a second embodiment of the present application.

According to some embodiments of the present application, as shown in FIGS. 1 and 2, an amorphous silicon (also known as a-Si) layer 4 and a first interlayer dielectric 5 are provided between the shading layer 12 and the first substrate 11, the first interlayer dielectric 5 forms an interlayer dielectric layer, and the first interlayer dielectric 5 is provided between the amorphous silicon layer 4 and the first substrate 11. A first through groove 12a is formed in the shading layer 12 and the amorphous silicon layer 4, and the first through groove 12a is disposed opposite to the sealant 3, such that the first through groove 12a is also located in the non-display area R1. An orthographic projection of the first through groove 12a on the first substrate 11 is located within an orthographic projection of the sealant 3 on the first substrate 11. The first through groove 12a penetrates the shading layer 12 and the amorphous silicon layer 4 in the thickness direction of the liquid crystal display panel 100. A part of the sealant 3 is filled in the first through groove 12a and is in direct contact with the first interlayer dielectric 5. That is, the sealant 3 filled in the first through groove 12a is in direct contact with the first interlayer dielectric 5. It can be understood that the first through groove 12a does not penetrate the first interlayer dielectric 5, for example, neither a part of the first through groove 12a is formed in the first interlayer dielectric 5, nor a groove is formed in the first interlayer dielectric 5 and forms a part of the first through groove 12a.

Therefore, the design of film layers including a shading layer 12, an amorphous silicon layer 4, and a first interlayer dielectric 5 is adopted, such that a part of a sealant 3 is filled in a first through groove 12a in the shading layer 12 and the amorphous silicon layer 4, and the sealant 3 is in direct contact with the first interlayer dielectric 5. During the reliability process, water vapor from the outside can be intercepted by the sealant 3 to prevent the water vapor from directly penetrating into the shading layer 12, thus effectively alleviating the phenomenon that the shading layer 12 is directly separated from the first substrate 11 due to intrusion of the water vapor into the shading layer 12, which in turn effectively alleviates film separation in the liquid crystal display panel 100, improves the reliability of the liquid crystal display panel 100, and contributes to an improvement in product yield.

Figure 3:
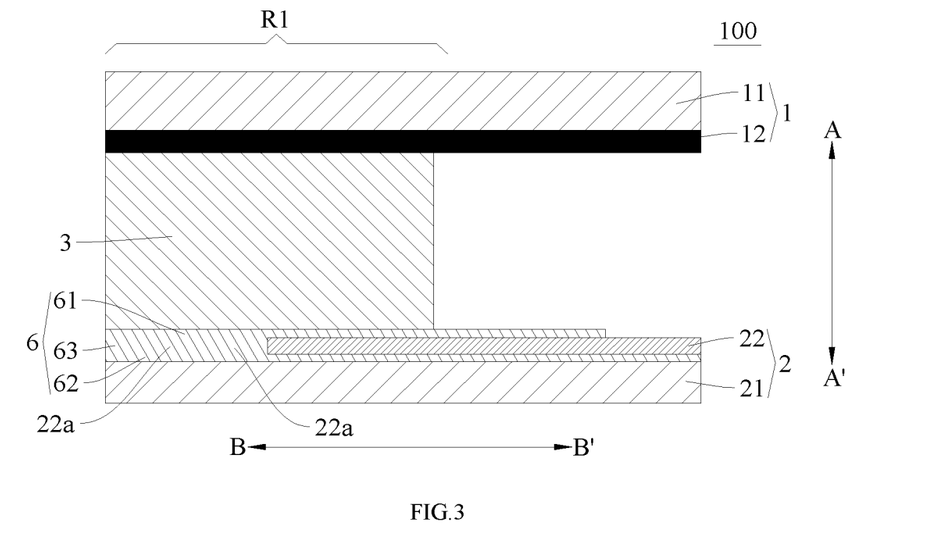
FIG. 3 is a schematic diagram of a liquid crystal display panel according to a third embodiment of the present application.
Figure 4:
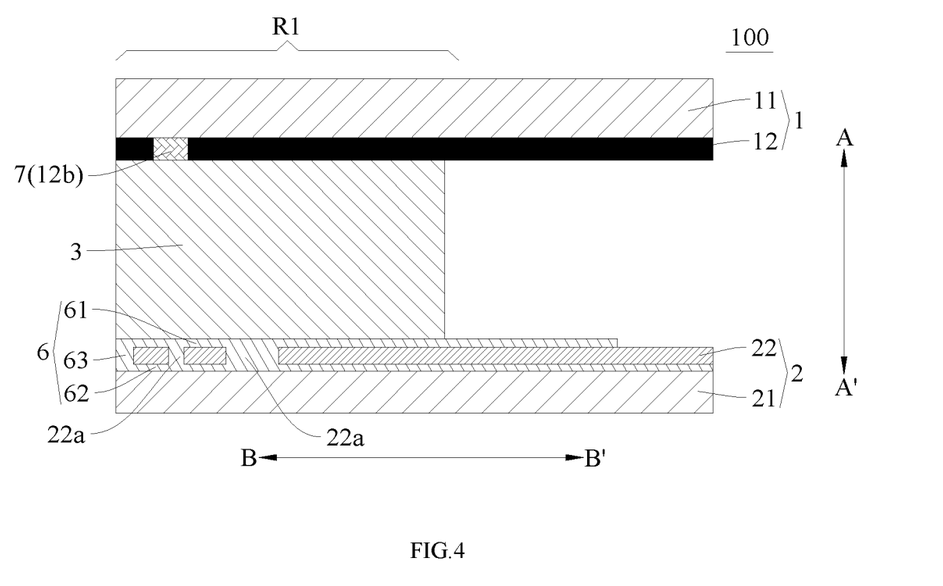
FIG. 4 is a schematic diagram of a liquid crystal display panel according to a fourth embodiment of the present application.

According to alternative embodiments of the present application, as shown in FIGS. 3 and 4, the planarization layer 22 is wrapped with a second interlayer dielectric 6 to separate the planarization layer 22 from the sealant 3 and the second substrate 21, respectively. That is, the second interlayer dielectric 6 covers an outer edge of the planarization layer 22 and both sides of the planarization layer 22 in a thickness direction, such that the planarization layer 22 is not in direct contact with the sealant 3, and the planarization layer 22 is not in direct contact with the second substrate 21. In other words, the second interlayer dielectric 6 at least covers an outer surface of the planarization layer 22 corresponding to an orthographic projection of the sealant 3 on the planarization layer 22, where the "outer surface" includes both side surfaces of the corresponding planarization layer 22 in a thickness direction and an outer peripheral surface of the corresponding planarization layer 22, and the second interlayer dielectric 6 is in direct contact with the sealant 3.

Therefore, the planarization layer 22 is wrapped with a second interlayer dielectric 6 such that the second interlayer dielectric 6 at least covers an outer surface of the planarization layer 22 located in an orthographic projection of the sealant 3 on the planarization layer 22, to separate the planarization layer 22 from the sealant 3 and the second substrate 21, respectively, and to bring the sealant 3 into direct contact with the second interlayer dielectric 6. In some scheme, a groove is provided in a planarization layer, and a sealant is filled into the groove to make direct contact with an interlayer dielectric between the planarization layer and a substrate. In this scheme, the planarization layer is in large-area contact with the interlayer dielectric located between the planarization layer and the substrate, resulting in poor wettability of the planarization layer and the interlayer dielectric, which easily leads to separation and cracking of the planarization layer and the interlayer dielectric during the reliability process, and thus causes the entry of the water vapor. Compared with the above scheme, in the present application, the water vapor from the outside can be intercepted by the sealant 3 during the reliability process of the liquid crystal display panel 100, and the water vapor cannot directly penetrate into the planarization layer 22, which effectively alleviates the entry of the water vapor caused by cracking of film layers and separation of the planarization layer 22 from the second interlayer dielectric 6 in case of pressure penetration due to poor wettability of the second interlayer dielectric 6 when the planarization layer 22 absorbs water, and in turn effectively alleviates film separation in the liquid crystal display panel 100, improves the reliability of the liquid crystal display panel 100, and contributes to an improvement in product yield.

Figure 5:
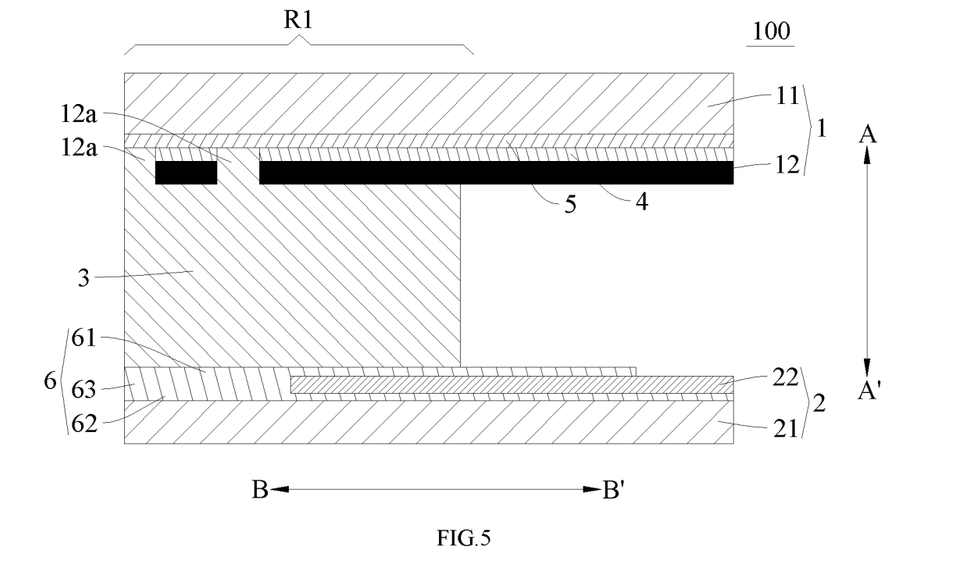
FIG. 5 is a schematic diagram of a liquid crystal display panel according to a fifth embodiment of the present application.
Figure 6:
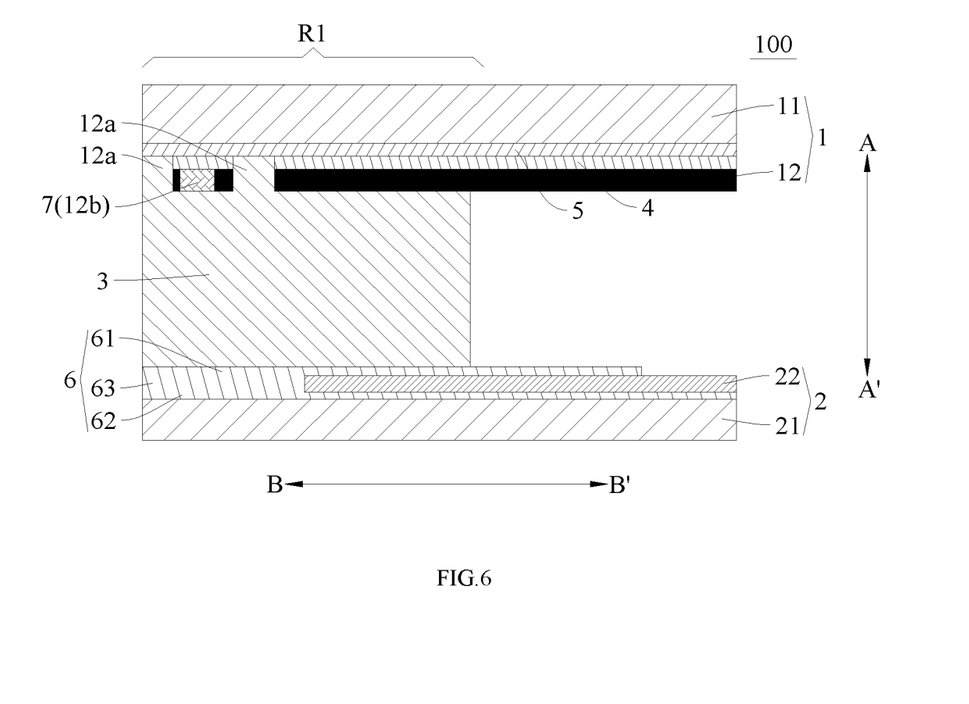
FIG. 6 is a schematic diagram of a liquid crystal display panel according to a sixth embodiment of the present application.
Figure 7:
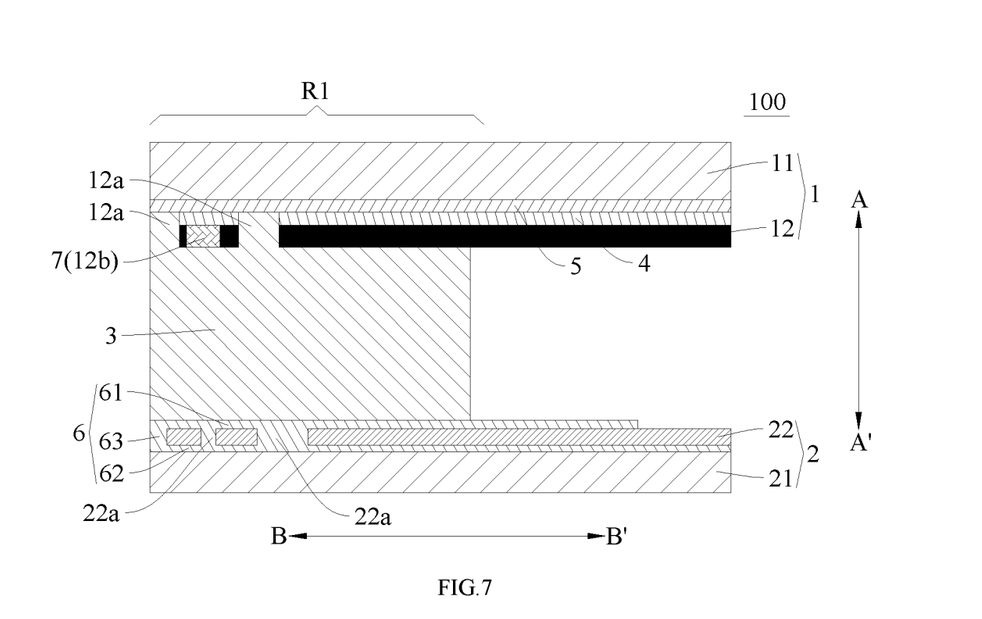
FIG. 7 is a schematic diagram of a liquid crystal display panel according to a seventh embodiment of the present application.

According to yet alternative embodiments of the present application, as shown in FIGS. 5 to 7, an amorphous silicon (also known as a-Si) layer 4 and a first interlayer dielectric 5 are provided between the shading layer 12 and the first substrate 11, the first interlayer dielectric 5 forms an interlayer dielectric layer, and the first interlayer dielectric 5 is provided between the amorphous silicon layer 4 and the first substrate 11. A first through groove 12a is formed in the shading layer 12 and the amorphous silicon layer 4, and the first through groove 12a is disposed opposite to the sealant 3, such that the first through groove 12a is also located in the non-display area R1. An orthographic projection of the first through groove 12a on the first substrate 11 is located within an orthographic projection of the sealant 3 on the first substrate 11. The first through groove 12a penetrates the shading layer 12 and the amorphous silicon layer 4 in the thickness direction of the liquid crystal display panel 100. A part of the sealant 3 is filled in the first through groove 12a and is in direct contact with the first interlayer dielectric 5. That is, the sealant 3 filled in the first through groove 12a is in direct contact with the first interlayer dielectric 5. The planarization layer 22 is wrapped with a second interlayer dielectric 6 to separate the planarization layer 22 from the sealant 3 and the second substrate 21, respectively. That is, the second interlayer dielectric 6 at least covers an outer surface of the planarization layer 22 located in an orthographic projection of the sealant 3 on the planarization layer 22, such that the planarization layer 22 is not in direct contact with the sealant 3, and the planarization layer 22 is not in direct contact with the second substrate 21, and the second interlayer dielectric 6 is in direct contact with the sealant 3.

Therefore, the design of film layers including a shading layer 12, an amorphous silicon layer 4, and a first interlayer dielectric 5 is adopted, such that a part of a sealant 3 is filled in a first through groove 12a in the shading layer 12 and the amorphous silicon layer 4, and the sealant 3 is in direct contact with the first interlayer dielectric 5. The planarization layer 22 is wrapped with a second interlayer dielectric 6 to separate the planarization layer 22 from the sealant 3 and the second substrate 21, respectively, and to bring the sealant 3 into direct contact with the second interlayer dielectric 6. During the reliability process, water vapor from the outside can be intercepted by the sealant 3 to prevent the water vapor from penetrating into the shading layer 12 and the planarization layer 22, thus effectively alleviating film separation in the liquid crystal display panel 100 and improving the reliability of the liquid crystal display panel 100.

It can be understood from the expression "the first through groove 12a is formed in the shading layer 12 and the amorphous silicon layer 4, and the first through groove 12a penetrates the shading layer 12 and the amorphous silicon layer 4 in the thickness direction of the liquid crystal display panel 100" that a through groove is formed in the shading layer 12 and penetrates the shading layer 12 in the thickness direction of the liquid crystal display panel 100, a through groove is formed in the amorphous silicon layer 4 and penetrates the amorphous silicon layer 4 in the thickness direction of the liquid crystal display panel 100, the through groove in the shading layer 12 and the through groove in the amorphous silicon layer 4 are disposed directly opposite to each other in the thickness direction of the liquid crystal display panel 100, and the through groove in the shading layer 12 and the through groove in the amorphous silicon layer 4 together form the first through groove 12a.

The liquid crystal display panel 100 according to embodiments of the present application adopts the design of film layers including a shading layer 12, an amorphous silicon layer 4, and a first interlayer dielectric 5, such that a part of a sealant 3 is filled in a first through groove 12a in the shading layer 12 and the amorphous silicon layer 4, and the sealant 3 is in direct contact with the first interlayer dielectric 5, and/or a planarization layer 22 is wrapped with a second interlayer dielectric 6, such that the planarization layer 22 is respectively separated from the sealant 3 and a second substrate 21, and the sealant 3 is in direct contact with the second interlayer dielectric 6, which effectively alleviates film separation in the liquid crystal display panel 100 and improves the reliability of the liquid crystal display panel 100.

In some embodiments, as shown in FIGS. 1 to 7, the shading layer 12 is made of a metal material. Compared with some schemes in which the shading layer is made of a polymer material, the shading layer 12 in the present application may not be crushed or broken by itself in the limit verification process during the reliability process, resulting in direct separation of the shading layer 12 from the first substrate 11, which is conducive to further alleviating the phenomenon of film separation in the liquid crystal display panel 100.

It can be understood that when the shading layer 12 is made of a metal material, the following cases may be included. The first case is shown in FIGS. 1 and 2, where the shading layer 12 is made of a metal material, an amorphous silicon layer 4 and a first interlayer dielectric 5 are provided between the shading layer 12 and the first substrate 11, the first interlayer dielectric 5 is located between the amorphous silicon layer 4 and the first substrate 11, and a first through groove 12a is formed in the shading layer 12 and the amorphous silicon layer 4, the first through groove 12a is disposed opposite to the sealant 3, and penetrates the shading layer 12 and the amorphous silicon layer 4 in the thickness direction of the liquid crystal display panel 100, and a part of the sealant 3 is filled in the first through groove 12a and is in direct contact with the first interlayer dielectric 5. The second case is shown in FIGS. 3 and 4, where the shading layer 12 is made of a metal material, the planarization layer 22 is wrapped with a second interlayer dielectric 6, such that the planarization layer 22 is separated from the sealant 3 and the second substrate 21, respectively, and the second interlayer dielectric 6 is in direct contact with the sealant 3. The third case is shown in FIGS. 5 to 7, where the shading layer 12 is made of a metal material, an amorphous silicon layer 4 and a first interlayer dielectric 5 are provided between the shading layer 12 and the first substrate 11, the first interlayer dielectric 5 is located between the amorphous silicon layer 4 and the first substrate 11, and a first through groove 12a is formed in the shading layer 12 and the amorphous silicon layer 4, the first through groove 12a is disposed opposite to the sealant 3, and penetrates the shading layer 12 and the amorphous silicon layer 4 in the thickness direction of the liquid crystal display panel 100, and a part of the sealant 3 is filled in the first through groove 12a and is in direct contact with the first interlayer dielectric 5, while the planarization layer 22 is wrapped with a second interlayer dielectric 6, such that the planarization layer 22 is separated from the sealant 3 and the second substrate 21, respectively, and the second interlayer dielectric 6 is in direct contact with the sealant 3.

In some embodiments, as shown in FIGS. 1, 2 and 5 to 7, in the case that the first through groove 12a is formed in the shading layer 12 and the amorphous silicon layer 4, there are a plurality of first through grooves 12a, and the plurality of first through grooves 12a are arranged at intervals in a direction (for example, a BB' direction in FIG. 1) perpendicular to a direction in which the first through groove 12a extends. In this way, a contact area between the sealant 3 and the first interlayer dielectric 5 is increased, such that during the reliability process, water vapor from the outside can be intercepted by the sealant 3 in the plurality of first through grooves 12a to prevent direct intrusion of the water vapor into the shading layer 12, which is conducive to further improving the reliability of the liquid crystal display panel 100.

In the description of the present application, "a plurality of" means two or more. It can be understood that in the case that the first through groove 12a is formed in the shading layer 12 and the amorphous silicon layer 4, the number of the first through groove 12a may be one.

In some embodiments, in the case that the first through groove 12a is formed in the shading layer 12 and the amorphous silicon layer 4, there is one first through groove 12a, and the one first through groove 12a is disposed at an outer edge of the liquid crystal display panel 100 to effectively block water vapor from the outside from entering the shading layer 12. Alternatively, as shown in FIGS. 1, 2 and 5 to 7, there are a plurality of first through grooves 12a, the plurality of first through grooves 12a being arranged at intervals in a direction (for example, a BB' direction in FIG. 1) perpendicular to a direction in which the first through groove 12a extends, and one of the plurality of first through grooves 12a being disposed at the outer edge of the liquid crystal display panel 100. At this time, the one of the plurality of first through grooves 12a may be open on the outside thereof, and the sealant 3 filled in the one of the plurality of first through grooves 12a may effectively block water vapor from the outside from entering the shading layer 12.

It can be understood that when there is one first through groove 12a, the first through groove 12a may be spaced apart from the outer edge of the liquid crystal display panel 100, and at this time, the first through groove 12a may be disposed adjacent to the outer edge of the liquid crystal display panel 100. When there are a plurality of first through grooves 12a, each of the first through grooves 12a may be spaced apart from the outer edge of the liquid crystal display panel 100.

In some embodiments, as shown in FIGS. 2, 6 and 7, in the case that the first through groove 12a is formed in the shading layer 12 and the amorphous silicon layer 4, a second through groove 12b is further formed in the shading layer 12. The second through groove 12b is spaced apart from the first through groove 12a. For example, the second through groove 12b is spaced apart from the first through groove 12a in parallel. The second through groove 12b penetrates at least the shading layer 12 from a side of the shading layer 12 away from the first substrate 11 in the thickness direction of the liquid crystal display panel 100. For example, the second through groove 12b may penetrate only the shading layer 12 in the thickness direction of the liquid crystal display panel 100, the second through groove 12b may penetrate the shading layer 12 and the amorphous silicon layer 4 in the thickness direction of the liquid crystal display panel 100, or the second through groove 12b may penetrate the shading layer 12, the amorphous silicon layer 4, and the first interlayer dielectric 5 in the thickness direction of the liquid crystal display panel 100. However, the arrangement of the second through groove 12b is not limited thereto, for example, the second through groove 12b may penetrate the shading layer 12 in the thickness direction of the liquid crystal display panel 100 and extend into the amorphous silicon layer 4, and at this time, the second through groove 12b has a depth greater than a thickness of the shading layer 12 and less than the sum of a thickness of the shading layer 12 and a thickness of the amorphous silicon layer 4.

In other words, the depth of the second through groove 12b is greater than or equal to the thickness of the shading layer 12, and the depth of the second through groove 12b is less than or equal to the sum of the thickness of the shading layer 12, the thickness of the amorphous silicon layer 4, and a thickness of the first interlayer dielectric 5. It can be understood that when the second through groove 12b penetrates the shading layer 12 and the amorphous silicon layer 4 in the thickness direction of the liquid crystal display panel 100, and the second through groove 12b extends to a side surface of the first interlayer dielectric 5 away from the first substrate 11, and the first through groove 12a also penetrates the shading layer 12 and the amorphous silicon layer 4 in the thickness direction of the liquid crystal display panel 100, and the first through groove 12a extend to the side surface of the first interlayer dielectric 5 away from the first substrate 11, the first interlayer dielectric 5 does not have any part of the first through groove 12a and the second through groove 12b formed therein, which facilitates the processing of the first through groove 12a and the second through groove 12b.

The second through groove 12b is filled with a blue pixel pigment 7, to achieve different shading effects. For example, in the examples of FIGS. 2, 6, and 7, there is one second through groove 12b.

The first through groove 12a is disposed on a side of the second through groove 12b adjacent to a central axis of the liquid crystal display panel 100 and/or on a side of the second through groove 12b away from the central axis of the liquid crystal display panel 100, which includes the following three cases. In the first case, the first through groove 12a is disposed on the side of the second through groove 12b adjacent to the central axis of the liquid crystal display panel 100, and at this time, there may be one or more first through grooves 12a. In the second case, the first through groove 12a is disposed on the side of the second through groove 12b away from the central axis of the liquid crystal display panel 100, and at this time, there may be one or more first through grooves 12a. In the third case, the first through grooves 12a are disposed on the side of the second through groove 12b adjacent to the central axis of the liquid crystal display panel 100 as well as on the side of the second through groove 12b away from the central axis of the liquid crystal display panel 100 as shown in FIG. 2, FIG. 6, and FIG. 7, and at this time, there are a plurality of first through grooves 12a. It can be understood that the number of the first through grooves 12a on the side of the second through groove 12b adjacent to the central axis of the liquid crystal display panel 100 may be the same or different from the number of the first through grooves 12a on the side of the second through groove 12b away from the central axis of the liquid crystal display panel 100. Therefore, the liquid crystal display panel 100 has a flexible structure design, which is convenient to ensure good applicability.

It should be noted that the central axis of the liquid crystal display panel 100 extends in the thickness direction of the liquid crystal display panel 100.

In some embodiments, as shown in FIGS. 3 to 7, in the case that the planarization layer 22 is wrapped with the second interlayer dielectric 6 such that the second interlayer dielectric 6 at least covers the outer surface of the planarization layer 22 located in the orthographic projection of the sealant 3 on the planarization layer 22, the second interlayer dielectric 6 includes a first portion 61, a second portion 62, and a connecting portion 63. The first portion 61 forms an interlayer dielectric layer, and the first portion 61 is provided between the planarization layer 22 and the sealant 3, such that the planarization layer 22 is separated from the sealant 3, and the first portion 61 is in direct contact with the sealant 3. The second portion 62 forms the interlayer dielectric layer, and the second portion 62 is provided between the planarization layer 22 and the second substrate 21 to separate the planarization layer 22 from the second substrate 21. The connecting portion 63 is provided at the outer edge of the liquid crystal display panel 100, and the connecting portion 63 is connected between the first portion 61 and the second portion 62. The connecting portion 63 covers an outer edge of the planarization layer 22 so as to ensure that the second interlayer dielectric 6 effectively wraps the planarization layer 22.

Optionally, the first portion 61 is made of the same material as that of the second portion 62.

In some embodiments, as shown in FIGS. 4 and 7, a third through groove 22a is formed in the planarization layer 22, and the third through groove 22a is disposed opposite to the sealant 3, such that the third through groove 22a is also located in the non-display area R1. An orthographic projection of the third through groove 22a on the second substrate 21 is located within an orthographic projection of the sealant 3 on the second substrate 21. The third through groove 22a penetrates the planarization layer 22 in the thickness direction of the liquid crystal display panel 100, and a part of the second interlayer dielectric 6 is filled in the third through groove 22a, so as to ensure that the first portion 61 is tightly bonded to the second portion 62, and to ensure that the second interlayer dielectric 6 is tightly bonded to the planarization layer 22, which further ensures that the second interlayer dielectric 6 effectively wraps the planarization layer 22 to prevent the water vapor from directly penetrating into the planarization layer 22, while simplifying the production process and reducing the production difficulty.

It can be understood that the third through groove 22a may not be formed in the planarization layer 22 as shown in FIGS. 3, 5, and 6, which also allows the second interlayer dielectric 6 to wrap around the planarization layer 22.

In some embodiments, as shown in FIGS. 4 and 7, there are a plurality of third through grooves 22a, and the plurality of third through grooves 22a are arranged at intervals in a direction (for example, an BB' direction in FIG. 4) perpendicular to a direction in which the third through groove 22a extends, such that during the reliability process, water vapor from the outside can be intercepted several times to prevent direct intrusion of the water vapor into the planarization layer 22, which is conducive to further improving the reliability of the liquid crystal display panel 100.

In some embodiments, in the case that the first through groove 12a is formed in the shading layer 12 and the amorphous silicon layer 4, each of the sealant 3 and the first through groove 12a may extend along the outer edge of the liquid crystal display panel 100 to form a ring structure. For example, an outer contour of the liquid crystal display panel 100 is formed in a square shape, and each of the sealant 3 and the first through groove 12a is formed in a square ring structure, so as to effectively prevent the water vapor from the outside from entering an interior of the liquid crystal display panel 100 from all around. However, the outer contour of the liquid crystal display panel 100 may also be formed in other shapes, such as a circle. It should be noted that in the description of the present application, the "ring structure" should be understood in a broad sense, including but not limited to polygonal ring structure, and circular ring structure.

In some embodiments, in the case that the planarization layer 22 is wrapped with the second interlayer dielectric 6 such that the second interlayer dielectric 6 at least covers the outer surface of the planarization layer 22 located in the orthographic projection of the sealant 3 on the planarization layer 22, and the third through groove 22a is formed in the planarization layer 22, each of the sealant 3 and the third through groove 22a may extend along the outer edge of the liquid crystal display panel 100 to form a ring structure. For example, an outer contour of the liquid crystal display panel 100 is formed in a square shape, and each of the sealant 3 and the third through groove 22a is formed in a square ring structure, so as to effectively prevent the water vapor from the outside from entering an interior of the liquid crystal display panel 100 from all around.

In some embodiments, in the case that the first through groove 12a is formed in the shading layer 12 and the amorphous silicon layer 4, the planarization layer 22 is wrapped with the second interlayer dielectric 6, and the third through groove 22a is formed in the planarization layer 22, each of the sealant 3, the first through groove 12a, and the third through groove 22a may extend along the outer edge of the liquid crystal display panel 100 to form a ring structure, so as to effectively prevent the water vapor from the outside from entering an interior of the liquid crystal display panel 100 from all around. Optionally, the first through groove 12a and the third through groove 22a are arranged in parallel.

In some embodiments, as shown in FIGS. 1 to 7, the shading layer 12 is made of molybdenum (Mo), the first interlayer dielectric 5 is made of silicon nitride ($SiN_x$), and the second interlayer dielectric 6 is made of silicon nitride ($SiN_x$) or silicon oxide ($SiO_x$). For example, the second interlayer dielectric 6 may be made of $SiO_2$.

It can be understood that the selection of materials for the shading layer 12, the first interlayer dielectric 5, and the second interlayer dielectric 6 is not limited thereto.

Optionally, in the examples of FIGS. 1 to 7, the first substrate 11 and the second substrate 21 are both glass substrates, and the planarization layer 22 is made of an acrylic material.

Figure 8:
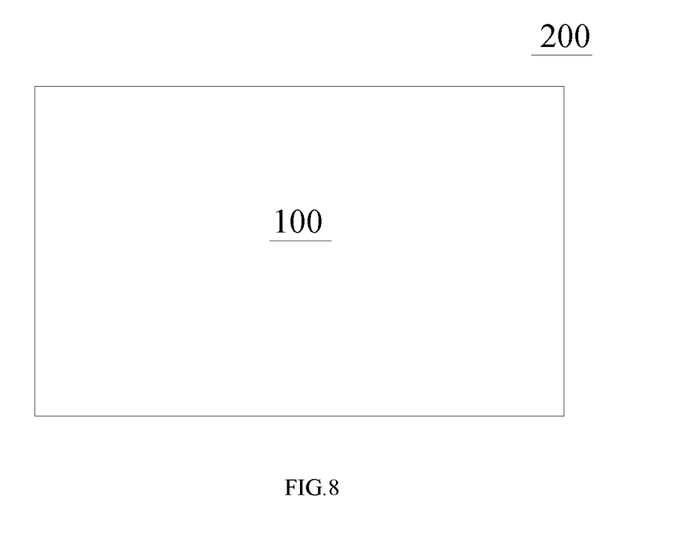
FIG. 8 is a schematic diagram of a display apparatus according to an embodiment of the present application.

A display apparatus 200 according to a second aspect of embodiments of the present application includes the liquid crystal display panel 100 according to the first aspect of embodiments of the present application described above. As shown in FIG. 8, the display apparatus 200 may include a product or component with a display function, such as a liquid crystal display, a mobile phone, a tablet computer, a monitor, a notebook computer, and a navigator.

The display apparatus 200 according to embodiments of the present application is provided with the above liquid crystal display panel 100, which improves the reliability of the display apparatus 200 and contributes to an improvement in product yield.

Other structures and operations of the display apparatus 200 according to embodiments of the present application are known to those ordinary skilled in the art, and will not be described in detail here.

In the description of the present application, it should be understood that terms such as "center", "thickness", "upper", "lower", "left", "right", "inner", "outer", "axial", "radial", and "circumferential" indicate orientations or positional relationships based on orientations or positional relationships shown in the accompanying drawings, and are intended only to facilitate and simplify the description of the present application, rather than indicating or implying the apparatus or element referred to must have a specific orientation, or be constructed and operated in a specific orientation, and therefore are not to be construed as limiting the present application.

In addition, terms "first" and "second" are only used for descriptive purposes, and are not to be construed as indicating or implying relative importance or implicitly specifying the number of the technical feature referred to. Thus, features qualified with "first" and "second" may explicitly or implicitly include one or more such features.

In the present application, unless otherwise expressly specified and limited, terms such as "install", "couple", "connect", and "fix" should be understood in a broad sense, for example, which may be a fixed connection or a detachable connection, or integrated; a mechanical connection, an electrical connection, or a communication; a direct connection or an indirect connection through an intermediate medium; and an internal communication between two elements or an interaction between two elements. For those ordinary skilled in the art, the specific meanings of the above terms in the present application can be understood according to specific situations.

In the description of this specification, reference to terms "an embodiment", "some embodiments", "example(s)", "specific example(s)", or "some examples", etc., means that the specific features, structures, materials, or characteristics described in combination with this embodiment or example are included in at least one embodiment or example of the present application. In this specification, the schematic representation of the above terms does not have to be directed to the same embodiment or example. Moreover, the specific features, structures, materials, or characteristics described may be combined in a suitable manner in any one or more embodiments or examples. In addition, those skilled in the art may combine different embodiments or examples described in this specification, and features in different embodiments or examples, without contradiction.

Although embodiments of the present application have been shown and described, it can be understood by those ordinary skilled in the art that various changes, modifications, replacements and variants may be made to these embodiments without departing from the principles and purposes of the present application, the scope of which is limited by the claims and their equivalents.

The invention claimed is:

1. A liquid crystal display panel, comprising:
a color filter substrate and an array substrate disposed opposite to each other, the color filter substrate comprising a first substrate and a shading layer, the shading layer being disposed on a side of the first substrate facing the array substrate, and the array substrate comprising a second substrate and a planarization layer, the planarization layer being disposed on a side of the second substrate facing the color filter substrate; and a sealant provided between the array substrate and the color filter substrate in a non-display area of the liquid crystal display panel, wherein an amorphous silicon layer and a first interlayer dielectric are provided between the shading layer and the first substrate, the first interlayer dielectric is provided between the amorphous silicon layer and the first substrate, a first through groove is formed in the shading layer and the amorphous silicon layer, is disposed opposite to the sealant, and penetrates the shading layer and the amorphous silicon layer in a thickness direction of the liquid crystal display panel, and a part of the sealant is filled in the first through groove and is in direct contact with the first interlayer dielectric.

2. The liquid crystal display panel according to claim 1, wherein the shading layer is made of a metal material.

3. The liquid crystal display panel according to claim 1, wherein a number of the first through groove is two or more, the two or more first through grooves being arranged at intervals in a direction perpendicular to a direction in which the first through groove extends.

4. The liquid crystal display panel according to claim 1, wherein
a number of the first through groove is one, the one first through groove being disposed at an outer edge of the liquid crystal display panel; or
a number of the first through groove is two or more, the two or more first through grooves being arranged at intervals in a direction perpendicular to a direction in which the first through groove extends, and one of the two or more first through grooves being disposed at the outer edge of the liquid crystal display panel.

5. The liquid crystal display panel according to claim 1, wherein
a second through groove is further formed in the shading layer, the second through groove is spaced apart from the first through groove, penetrates at least the shading layer from a side of the shading layer away from the first substrate in the thickness direction of the liquid crystal display panel, and is filled with a blue pixel pigment, and
the first through groove is disposed on a side of the second through groove adjacent to a central axis of the liquid crystal display panel and/or on a side of the second through groove away from the central axis of the liquid crystal display panel.

6. The liquid crystal display panel according to claim 1, wherein the shading layer is made of molybdenum, and the first interlayer dielectric is made of silicon nitride.

7. The liquid crystal display panel according to claim 1, wherein the planarization layer is wrapped with a second interlayer dielectric, such that the planarization layer is respectively separated from the sealant and the second substrate, and the second interlayer dielectric is in direct contact with the sealant.

8. The liquid crystal display panel according to claim 7, wherein the second interlayer dielectric comprises:
a first portion provided between the planarization layer and the sealant, such that the planarization layer is separated from the sealant, and the first portion is in direct contact with the sealant;
a second portion provided between the planarization layer and the second substrate to separate the planarization layer from the second substrate; and
a connecting portion, provided at an outer edge of the liquid crystal display panel, and connected between the first portion and the second portion.

9. The liquid crystal display panel according to claim 8, wherein a third through groove is formed in the planarization layer, the third through groove being disposed opposite to the sealant, and penetrating the planarization layer in the thickness direction of the liquid crystal display panel, and a part of the second interlayer dielectric is filled in the third through groove.

10. The liquid crystal display panel according to claim 9, wherein a number of the third through groove is two or more, the two or more third through grooves being arranged at intervals in a direction perpendicular to a direction in which the third through groove extends.

11. The liquid crystal display panel according to claim 9, wherein each of the sealant, the first through groove, and the third through groove extends along the outer edge of the liquid crystal display panel to form a ring structure.

12. The liquid crystal display panel according to claim 7, wherein the second interlayer dielectric is made of silicon nitride or silicon oxide.

13. A display apparatus, comprising a liquid crystal display panel, wherein the liquid crystal display panel comprises:
a color filter substrate and an array substrate disposed opposite to each other, the color filter substrate comprising a first substrate and a shading layer, the shading layer being disposed on a side of the first substrate facing the array substrate, and the array substrate comprising a second substrate and a planarization layer, the planarization layer being disposed on a side of the second substrate facing the color filter substrate; and
a sealant provided between the array substrate and the color filter substrate in a non-display area of the liquid crystal display panel,
wherein an amorphous silicon layer and a first interlayer dielectric are provided between the shading layer and the first substrate, the first interlayer dielectric is provided between the amorphous silicon layer and the first substrate, a first through groove is formed in the shading layer and the amorphous silicon layer, is disposed opposite to the sealant, and penetrates the shading layer and the amorphous silicon layer in a thickness direction of the liquid crystal display panel, and a part of the sealant is filled in the first through groove and is in direct contact with the first interlayer dielectric.

14. The display apparatus according to claim 13, wherein the shading layer is made of a metal material.

15. The display apparatus according to claim 13, wherein a number of the first through groove is two or more, the two or more first through grooves being arranged at intervals in a direction perpendicular to a direction in which the first through groove extends.

16. The display apparatus according to claim 13, wherein
a number of the first through groove is one, the one first through groove being disposed at an outer edge of the liquid crystal display panel; or
a number of the first through groove is two or more, the two or more first through grooves being arranged at intervals in a direction perpendicular to a direction in which the first through groove extends, and one of the two or more first through grooves being disposed at the outer edge of the liquid crystal display panel.

17. The display apparatus according to claim 13, wherein
a second through groove is further formed in the shading layer, the second through groove is spaced apart from the first through groove, penetrates at least the shading layer from a side of the shading layer away from the first substrate in the thickness direction of the liquid crystal display panel, and is filled with a blue pixel pigment, and the first through groove is disposed on a side of the second through groove adjacent to a central axis of the liquid crystal display panel and/or on a side of the second through groove away from the central axis of the liquid crystal display panel.

18. The display apparatus according to claim 13, wherein the planarization layer is wrapped with a second interlayer dielectric, such that the planarization layer is respectively separated from the sealant and the second substrate, and the second interlayer dielectric is in direct contact with the sealant.

19. The display apparatus according to claim 18, wherein the second interlayer dielectric comprises:

a first portion provided between the planarization layer and the sealant, such that the planarization layer is separated from the sealant, and the first portion is in direct contact with the sealant;

a second portion provided between the planarization layer and the second substrate to separate the planarization layer from the second substrate; and a connecting portion, provided at an outer edge of the liquid crystal display panel, and connected between the first portion and the second portion.

20. The display apparatus according to claim 19, wherein a third through groove is formed in the planarization layer, the third through groove being disposed opposite to the sealant, and penetrating the planarization layer in the thickness direction of the liquid crystal display panel, and a part of the second interlayer dielectric is filled in the third through groove.

* * * * *